US012254375B2

(12) United States Patent
Ishimaru

(10) Patent No.: US 12,254,375 B2
(45) Date of Patent: Mar. 18, 2025

(54) READING CONTROLLER AND READING CONTROL METHOD

(71) Applicant: ISUZU MOTORS LIMITED, Tokyo (JP)

(72) Inventor: Masakazu Ishimaru, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 10 days.

(21) Appl. No.: 17/905,783

(22) PCT Filed: Mar. 16, 2021

(86) PCT No.: PCT/JP2021/010545
§ 371 (c)(1),
(2) Date: Sep. 7, 2022

(87) PCT Pub. No.: WO2021/187463
PCT Pub. Date: Sep. 23, 2021

(65) Prior Publication Data
US 2024/0211707 A1  Jun. 27, 2024

(30) Foreign Application Priority Data

Mar. 17, 2020 (JP) .................. 2020-046555

(51) Int. Cl.
*G06K 7/10* (2006.01)
(52) U.S. Cl.
CPC ................ *G06K 7/10366* (2013.01)
(58) Field of Classification Search
CPC ......... G06K 7/10366; G06K 7/10415; G06K 7/10425; G06K 7/10445; G06Q 20/203
See application file for complete search history.

(56) References Cited

U.S. PATENT DOCUMENTS

| 7,866,555 B2* | 1/2011 | Schmid ............. G06K 19/0723 |
| | | 705/28 |
| 2023/0132833 A1* | 5/2023 | Imai ..................... G06Q 50/40 |
| | | 235/451 |

FOREIGN PATENT DOCUMENTS

| JP | 2006103885 A | 4/2006 |
| JP | 2007137553 A | 6/2007 |
| JP | 2008133085 A | 6/2008 |

(Continued)

OTHER PUBLICATIONS

International Search Report of PCT/JP2021/10545 dated May 18, 2021.

*Primary Examiner* — Edwyn Labaze
*Assistant Examiner* — April A Taylor
(74) *Attorney, Agent, or Firm* — Shih IP Law Group, PLLC.

(57) ABSTRACT

A reading controller includes an open/closed state determination part that determines an open/closed state of a door of a load chamber of a vehicle, a tag information acquisition part that acquires tag information stored in a tag attached to a load, via a communication element that is installed in the load chamber and reads the tag, and a radio wave control part that controls a radio wave strength of radio waves emitted by the communication element for reading the tag to be a first radio wave strength when the open/closed state determination part determines that the door is in the closed state, and controls the radio wave strength to be a second radio wave strength, which is lower than the first radio wave strength, when the door is in the open state.

6 Claims, 6 Drawing Sheets

(56) References Cited

FOREIGN PATENT DOCUMENTS

JP         4244859 B2    3/2009
JP     2014189361 A    10/2014

* cited by examiner

READING CONTROLLER AND READING CONTROL METHOD

CROSS-REFERENCE TO RELATED APPLICATIONS

The present application is a U.S. National Stage entry of PCT Application number PCT/JP2021/010545, filed on Mar. 16, 2021, which claims priority under 35 U.S.C § 119(a) to Japanese Patent Application No. 2020-046555, filed on Mar. 17, 2020, contents of which are incorporated herein by reference in their entirety.

TECHNICAL FIELD

The present disclosure relates to a reading controller and a reading control method for acquiring information stored in a tag.

BACKGROUND OF THE INVENTION

A technique for reading load information stored in a tag attached to a load when the load is carried into a load chamber of a vehicle has been proposed (for example, see Patent Document 1).

PRIOR ART

Patent Document

Patent Document 1: Japanese Unexamined Patent Application Publication No. 2006-103885

BRIEF DESCRIPTION OF THE INVENTION

Problem to be Solved by the Invention

When reading tags while the door of a load chamber of the vehicle is open, since a reading controller described in Patent Document 1 reads even information on a tag of a load that is not loaded in the load chamber, there was a problem that it is impossible to distinguish between a load loaded in the load chamber and a load not loaded into the load chamber.

The present disclosure focuses on this point, and its object is to provide a reading controller and a reading control method that can prevent or reduce reading of a load outside a load chamber of a vehicle.

Means for Solving the Problem

A reading controller according to a first aspect of the present disclosure includes: an open/closed state determination part that determines an open state or a closed state of a door of a load chamber of a vehicle; a tag information acquisition part that acquires tag information stored in a tag attached to a load, via a communication element that is installed in the load chamber and reads the tag; and a radio wave control part that controls radio wave strength of radio waves emitted by the communication element for reading the tag to be a first radio wave strength when the open/closed state determination part determines that the door is in the closed state, and controls the radio wave strength to be a second radio wave strength, which is lower than the first radio wave strength, when the open/closed state determination part determines that the door is in the open state.

A plurality of the communication elements may be disposed in the load chamber, and the radio wave control part may make the radio wave strength of the radio waves emitted by the communication element near the door among the plurality of communication elements installed in the load chamber lower than the radio wave strength emitted by the communication element distant from the door, when the open/closed state determination part determines that the door is in the open state. The reading controller may further include a receiving part that receives, from a wireless terminal, instruction information instructing a start of reading, wherein the tag information acquisition part may start acquisition of the tag information via the communication element when the receiving part receives the instruction information.

A reading controller according to a second aspect of the present disclosure includes an open/closed state determination part that determines an open state or a closed state of a door of a load chamber of a vehicle; a tag information acquisition part that acquires tag information stored in a tag attached to a load, via a communication element that is installed in the load chamber and reads the tag; and a sensitivity control part that controls a reading sensitivity of the communication element for reading the tag to be a first reading sensitivity when the open/closed state determination part determines that the door is in the closed state, and controls the reading sensitivity to be a second reading sensitivity, which is lower than the first reading sensitivity, when the open/closed state determination part determines that the door is in the open state.

A reading control method according to a third aspect of the present disclosure includes the steps of: determining an open state or a closed state of a door of a load chamber of a vehicle; acquiring tag information stored in a tag attached to a load, via a communication element that is installed in the load chamber and reads the tag; and controlling radio wave strength of radio waves emitted by the communication element for reading the tag to be a first radio wave strength when the door is determined to be in a closed state and controlling the radio wave strength to be a second radio wave strength, which is lower than the first radio wave strength, when the door is determined to be in the open state, that are executed by a reading controller.

The reading control method may further include a step of transmitting the acquired tag information to a wireless terminal, executed by the reading controller, and steps of: receiving the tag information; determining, by referencing list information indicating a list of identification information of tags attached to a plurality of loads scheduled to be loaded in the load chamber, whether (i) the identification information of the tags included in the received tag information and (ii) the identification information of the tags included in list information match, and notifying a user of a determination result, that are executed by the wireless terminal.

The wireless terminal may notify the user that the loads have not been loaded in a scheduled manner in the notifying step if it is determined that (i) the identification information of the tags included in the received tag information and (ii) the identification information of the tags included in the list information do not match after the tags are read at the first radio wave strength. The wireless terminal may notify the user of the identification information of the tag attached to a load that has not yet been carried into the load chamber among the identification information of the tags included in the list information in the notifying step.

A reading control method according to a fourth aspect of the present disclosure includes steps of: determining an open state or a closed state of a door of a load chamber of a vehicle; acquiring tag information stored in a tag attached to a load, via a communication element that is installed in the load chamber and reads the tag; and controlling a reading sensitivity of the communication element for reading the tag to be a first reading sensitivity when the door is determined to be in the closed state, and controlling the reading sensitivity to be a second reading sensitivity, which is lower than the first reading sensitivity, when the door is determined to be in the open state, that are executed by a reading controller.

Effect of the Invention

According to the present disclosure, it is possible to prevent or reduce reading of a load outside a load chamber of a vehicle.

DESCRIPTION OF EMBODIMENTS

First Embodiment

[Outline of a Reading Controller]

Figure 1:
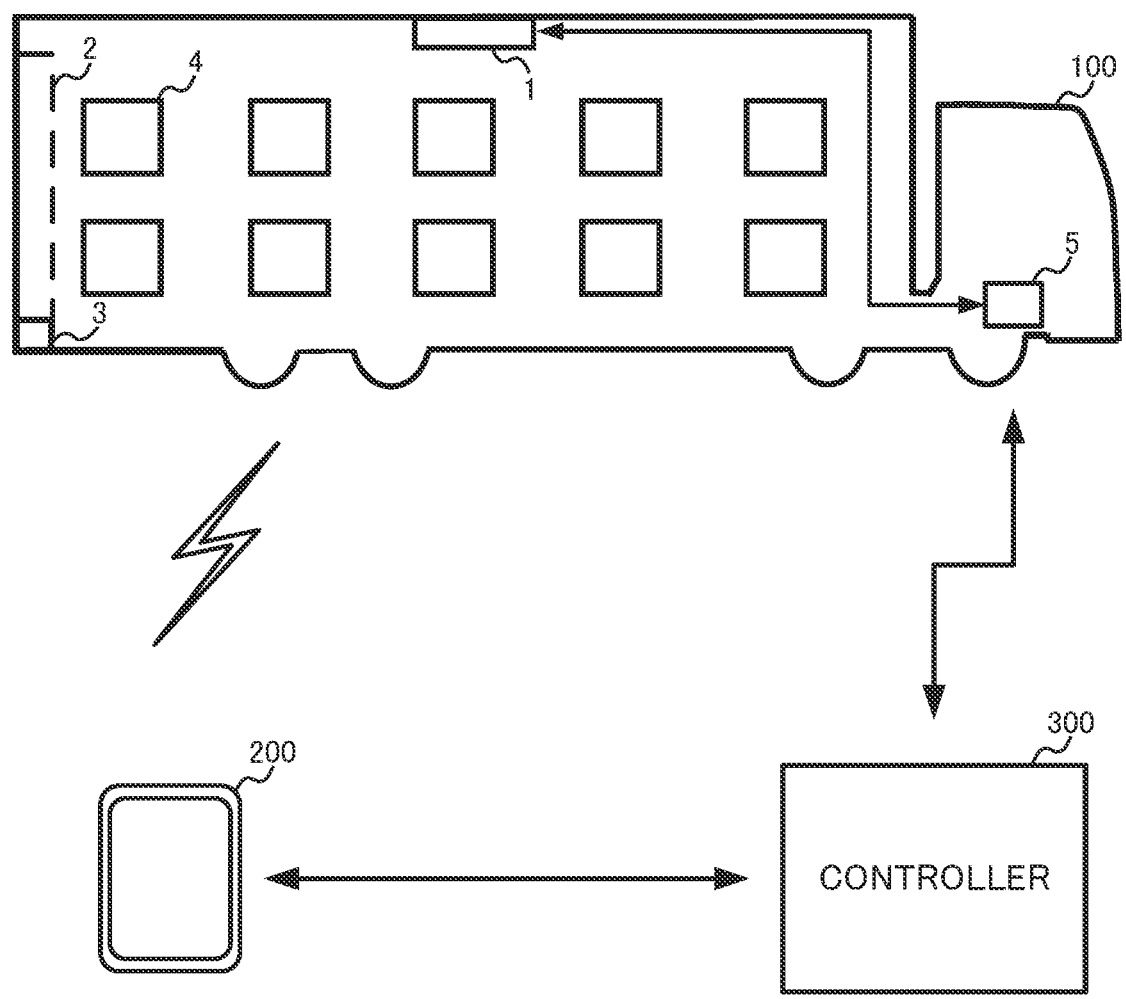
FIG. 1 shows an outline of a reading controller according to a first embodiment.

FIG. 1 shows an outline of a reading controller 1 according to a first embodiment. A vehicle 100 on which the reading controller 1 is mounted is shown. The vehicle 100 is a truck having a load chamber for loading a load, for example. The walls and ceiling of the load chamber are made of metal plates. The vehicle 100 includes a door 2, an open/closed sensor 3, a communication element 4, a communication unit 5, and the reading controller 1. The door 2 is used to carry the load into the load chamber of the vehicle 100. The open/closed sensor 3 detects an open state in which the door 2 is open and a closed state in which the door 2 is closed.

The communication element 4 is installed in the load chamber of the vehicle 100. For example, the communication element 4 is installed on the side wall of the load chamber. The communication element 4 is a communication unit including a coiled antenna, a modulation circuit, and a demodulation circuit, for example. The communication element 4 receives radio waves emitted by a tag attached to a load in the load chamber through the coiled antenna. The communication element 4 demodulates the received radio waves. The tag is a radio frequency identifier (RFID) tag without a battery, for example. The tag stores tag information including identification information for identifying the tag. The identification information is a tag ID (TID) or an electronic product code (EPC), for example. The communication element 4 supplies power for wireless communication to the tag using a contactless power supply method such as a radio wave method, and receives the tag information transmitted by the tag.

A plurality of communication elements 4 are disposed in the load chamber. By slightly shifting the timing of emitting radio waves, the communication elements 4 can read tags almost simultaneously while suppressing interference of the radio waves among the plurality of communication elements 4. Further, the communication elements 4 can read a plurality of tags almost simultaneously by slightly shifting the timing of communication with each of the plurality of tags.

The communication unit 5 is a communication module for performing wireless communication with a management apparatus 300 via a mobile phone network. The communication unit 5 communicates with the management apparatus 300 by using a wireless communication method such as 4G, for example. The management apparatus 300 is a server that manages traveling data indicating a traveling state of the vehicle 100, such as a traveling distance of the vehicle 100, for example. The communication unit 5 wirelessly communicates with a wireless terminal 200 via the management apparatus 300. The communication unit 5 is connected to the reading controller 1 with a signal cable. The wireless terminal 200 is a smartphone, for example. The wireless terminal 200 may be an in-vehicle controller capable of communicating with Bluetooth (registered trademark) or Wi-Fi (registered trademark). The wireless terminal 200 is an infotainment device such as a display audio, for example.

The reading controller 1 is an RFID reader. The reading controller 1 communicates with the wireless terminal 200 of a user via the communication unit 5, for example. For example, the reading controller 1 receives, from the wireless terminal 200, instruction information instructing the start of tag reading. Further, the reading controller 1 may directly communicate with the wireless terminal 200 of the user through wireless communication such as Wi-Fi, Bluetooth, or the like.

The reading controller 1 acquires the tag information via the communication element 4. The reading controller 1 determines an open/closed state of the door 2 on the basis of a detection result of the open/closed sensor 3. When the reading controller 1 determines that the door 2 is in the closed state, the reading controller 1 controls the radio wave strength of radio waves emitted by the communication element 4 to be a first radio wave strength. When the reading controller 1 determines that the door 2 is in the open state, the reading controller 1 controls the radio wave strength to be a second radio wave strength lower than the first radio wave strength.

When the reading controller 1 determines that the door 2 is in the open state, the reading controller 1 can prevent or reduce leakage of the radio waves to the outside of the load chamber by reading the tag at the relatively low second radio wave strength. In this way, the reading controller 1 can prevent or reduce reading of a tag attached to a load outside the load chamber. In a case where the door 2 is in the open state, the tag moves relative to the communication element 4 when the load is carried into the load chamber. Therefore, the reading controller 1 can improve the reading accuracy by reading the tag when the tag passes through a position easily reached by the radio waves of the communication element 4. On the other hand, the risk of leakage of the radio waves to the outside of the load chamber is small when the door 2 is in the closed state of. Therefore, the reading controller 1 can improve the accuracy of tag reading by relatively increasing the radio wave strength in the closed state.

[Vehicle Configuration]

Figure 2:
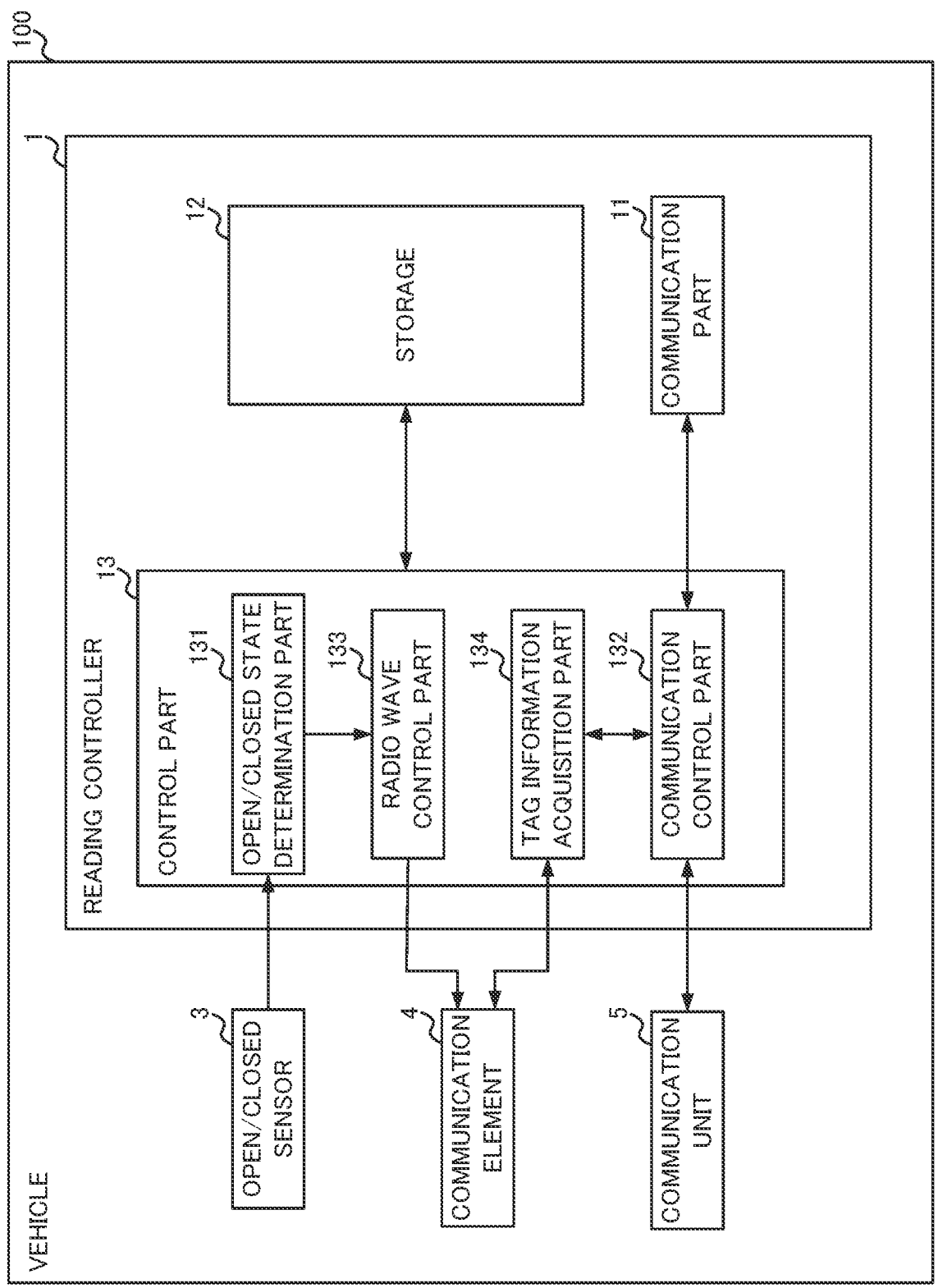
FIG. 2 shows a configuration of a vehicle.

FIG. 2 shows a configuration of the vehicle 100. The vehicle 100 includes a reading controller 1, an open/closed sensor 3, a plurality of communication elements 4, and a communication unit 5. The reading controller 1 includes a communication part 11, a storage 12, and a control part 13.

The communication part 11 is a communication module for communicating with the wireless terminal 200 through a wireless communication method such as Bluetooth, Wi-Fi, or the like. The storage 12 includes a read only memory (ROM), a random access memory (RAM), and the like, for example. The storage 12 stores various programs and various types of data for causing the control part 13 to function. The control part 13 is a central processing unit (CPU), for example. The control part 13 functions as an open/closed state determination part 131, a communication control part 132, a radio wave control part 133, and a tag information acquisition part 134 by executing the programs stored in the storage 12.

Figure 3:
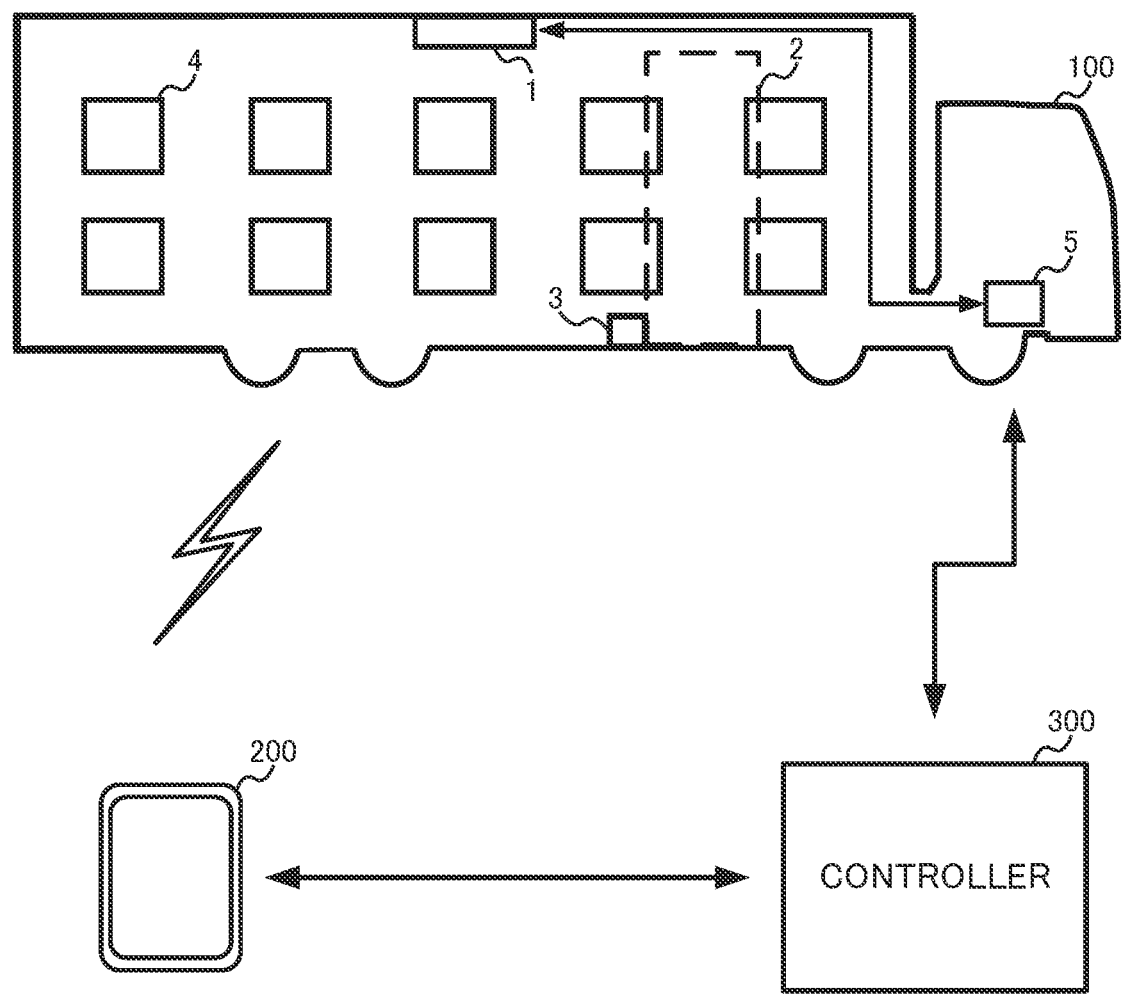
FIG. 3 shows another example of a door of the vehicle.

The open/closed state determination part 131 determines the open/closed state of the door 2 in the load chamber of the vehicle 100 on the basis of the detection result of the open/closed sensor 3. The door 2 is installed at a rear of the load chamber, as shown in FIG. 1, but is not limited thereto. For example, the door 2 may be installed on the side wall of the load chamber. FIG. 3 shows another example of the door 2 of the vehicle 100. In the example of FIG. 3, the door 2 and the open/closed sensor 3 are installed on the side wall of the load chamber.

The communication control part 132 communicates with the management apparatus 300 via the communication unit 5 and the mobile phone network. The communication control part 132 communicates with the wireless terminal 200 of the user via the management apparatus 300. Further, the communication control part 132 may directly communicate with the wireless terminal 200 of the user via the communication part 11 using the wireless communication method such as Bluetooth or Wi-Fi. The communication control part 132 receives, from the wireless terminal 200, the instruction information instructing the start of tag reading, for example. The communication control part 132 outputs the received instruction information to the tag information acquisition part 134. The communication control part 132 transmits information indicating the open/closed state of the door 2 determined by the open/closed state determination part 131 to the wireless terminal 200. The communication control part 132 transmits, to the wireless terminal 200, the tag information of the tag read by the communication elements 4 input from the tag information acquisition part 134.

[Control of Radio Wave Strength]

The radio wave control part 133 controls the radio wave strength of the radio waves emitted by the communication elements 4. When the open/closed state determination part 131 determines that the door 2 is in the closed state, the radio wave control part 133 controls the radio wave strength of the radio waves emitted by the communication elements 4 to be the first radio wave strength in order to read the tag. The first radio wave strength is the maximum value of the radio wave strength of the radio waves emitted by the communication elements 4, for example. On the other hand, when the open/closed state determination part 131 determines that the door is in the open state, the radio wave control part 133 controls the strength of the radio waves emitted by the communication elements 4 to be the second radio wave strength, which is lower than the first radio wave strength. The second radio wave strength is the minimum value of the radio wave strength of the radio waves emitted by the communication elements 4, for example.

Further, the radio wave control part 133 is not limited to the example in which the plurality of communication elements 4 are controlled to emit radio waves of the same radio wave strength. For example, when the open/closed state determination part 131 determines that the door 2 is in the open state, the radio wave control part 133 may make the strength of radio waves emitted by the communication elements 4 near the door 2 among the plurality of communication elements 4 installed in the load chamber lower than the strength of the radio waves emitted by communication elements 4 distant from the door 2.

More specifically, when the open/closed state determination part 131 determines that the door 2 is in the open state, the radio wave control part 133 sets the radio wave strength of the radio waves emitted by the communication elements 4 near the door 2 to the second radio wave strength. At this time, the radio wave control part 133 sets the radio wave strength of radio waves emitted by the communication elements 4 which are farther from the door 2 than the communication elements 4 that emit the radio waves of the second radio wave strength to the first radio wave strength, which is greater than the second radio wave strength.

On the other hand, when the open/closed state determination part 131 determines that the door 2 is in the closed state, the radio wave control part 133 sets the radio wave strength of all the radio waves emitted by all the communication elements 4 in the load chamber to the relatively high first radio wave strength. In this way, since the radio wave control part 133 causes the radio wave strength of the radio waves emitted by the communication elements 4 closer to the door 2 to be lower than the first radio wave strength when the door 2 is in the open state, the radio wave control part 133 can prevent or reduce the leakage of the radio waves to the outside of the load chamber.

The tag information acquisition part 134 acquires the tag information stored in the tag attached to the load via the communication elements 4. When the communication control part 132 receives the instruction information, the tag information acquisition part 134 starts acquisition of the tag information via the communication elements 4. The tag information acquisition part 134 outputs the acquired tag information to the communication control part 132.

[Configuration of a Wireless Terminal]

Figure 4:
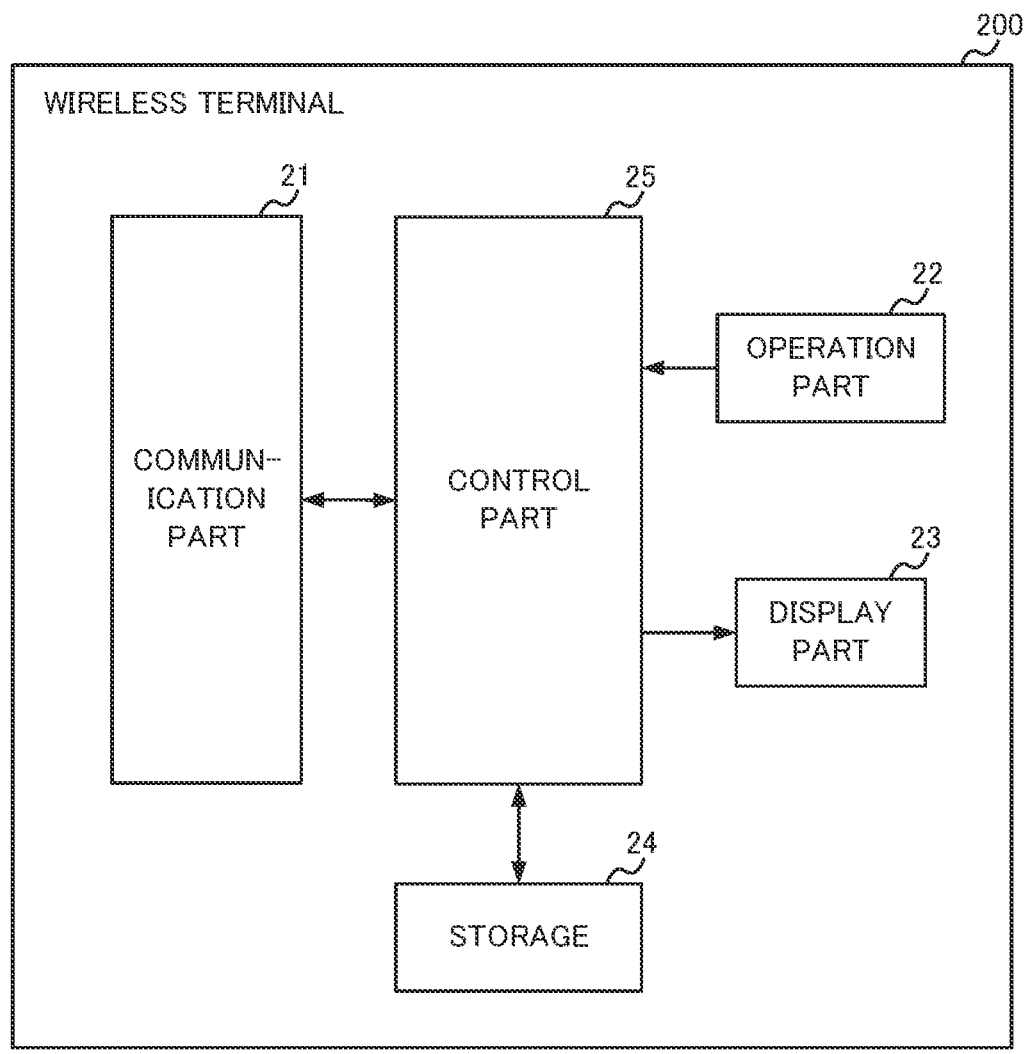
FIG. 4 shows a configuration of a wireless terminal.

FIG. 4 shows a configuration of the wireless terminal 200. The wireless terminal 200 includes a communication part 21, an operation part 22, a display part 23, a storage 24, and a control part 25.

The communication part 21 is a wireless communication module for communicating with the reading controller 1 or the management apparatus 300. For example, the communication part 21 communicates with the reading controller 1 through a wireless communication method such as Wi-Fi, Bluetooth, or the like. The communication part 21 communicates with the management apparatus 300 via wireless communication lines such as 4G. The communication part 21 may communicate with the reading controller 1 via the management apparatus 300.

The operation part 22 is a touch screen that detects a user's touch operation, for example. The display part 23 is a display for displaying an image. The touch screen includes the display part 23 and the operation part 22. The storage 24 includes a ROM, a RAM, and the like, for example. The storage 24 stores various programs and various types of data for causing the control part 25 to function.

The control part 25 is a CPU, for example. The control part 25 executes various kinds of processing by executing the programs stored in the storage 24. The control part 25 communicates with the management apparatus 300 via the communication part 21. The control part 25 receives, from the management apparatus 300, list information indicating a list of identification information of tags attached to a plurality of loads scheduled to be loaded in the load chamber of the vehicle 100. For example, when the control part 25 accepts a user's operation instructing an update of the list information, the control part 25 receives the list information from the management apparatus 300. The control part 25 causes the storage 24 to store the received list information.

The control part 25 determines whether the loads have been loaded in the load chamber as scheduled. The control part 25 receives the tag information read by the communication element 4 from the reading controller 1. The control part 25 reads, from the storage 24, the list information indicating the list of identification information of the tags attached to the plurality of loads scheduled to be loaded in the load chamber. By referencing the read list information, the control part 25 determines whether (i) the identification information of the tag included in the tag information received from the reading controller 1 and (ii) the identification information of the tags included in the list information match.

The control part 25 notifies the user of a determination result. More specifically, the control part 25 receives, from the reading controller 1, information indicating the open/closed state determined by the open/closed state determination part 131. When the received information indicating the open/closed state indicates that the door is in the open state, the control part 25 displays whether or not each piece of identification information of the plurality of tags included in the list indicated by the list information is included in the received tag information. In this way, the control part 25 can notify the user about identification information of the tag attached to a load that has not yet been carried into the load chamber, during carry-in work of the loads into the load chamber.

When it is determined that (i) the identification information of the tag included in the tag information acquired by the tag information acquisition part 134 and (ii) the identification information of the tags included in the list information do not match after tag reading is performed at the relatively high first radio wave strength, the control part 25 notifies the user that the loads have not been loaded as scheduled. For example, in addition to displaying whether or not each piece of identification information of the plurality of tags included in the list indicated by the list information is included in the received tag information, the control part 25 causes the display part 23 to display a message indicating that the loads have not been loaded as scheduled.

[Processing Procedure of Acquiring Tag Information]

Figure 5:
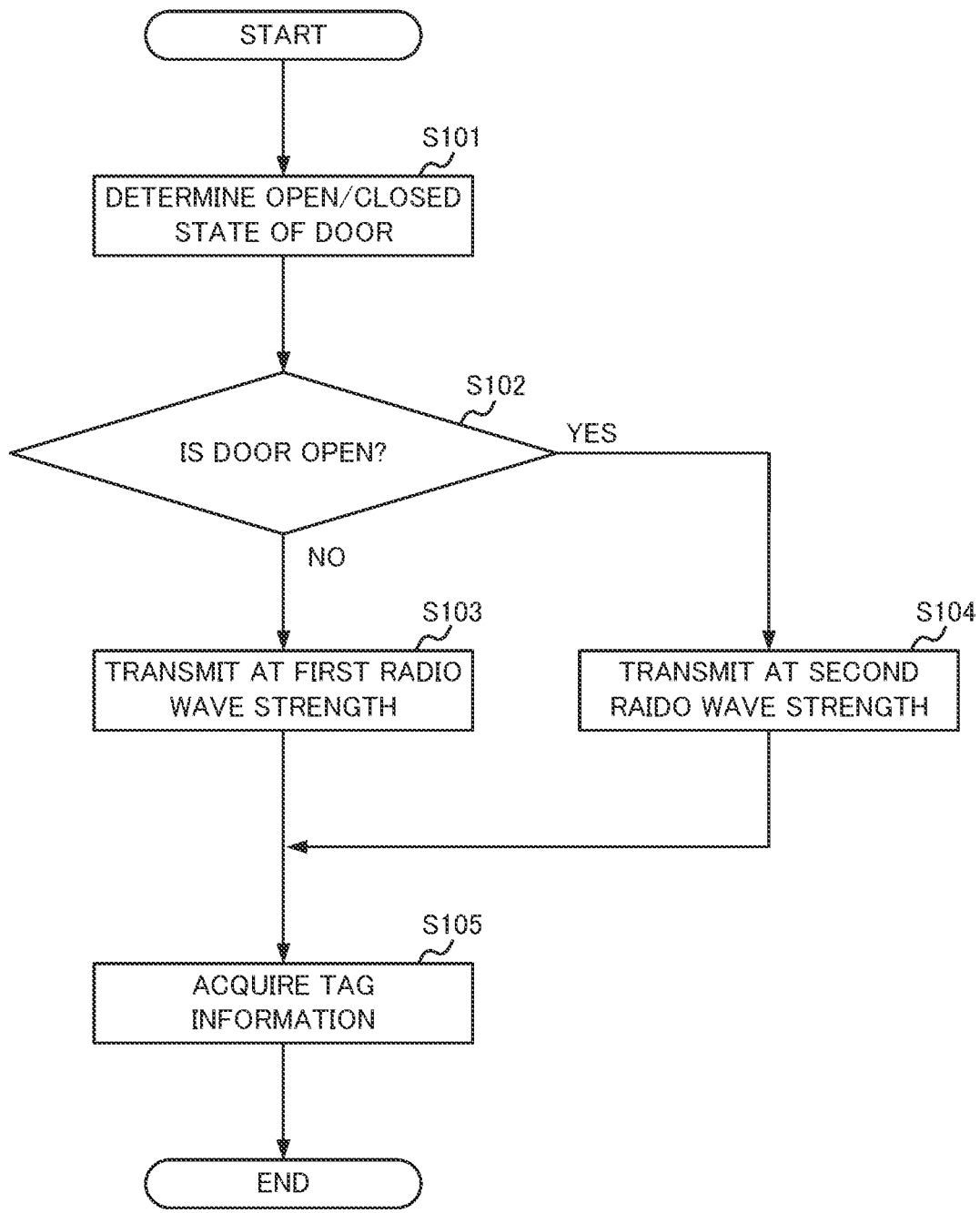
FIG. 5 is a flowchart showing a processing procedure of reading a tag attached to a load with the reading controller.

FIG. 5 is a flowchart showing a processing procedure of reading the tag attached to the load with the reading controller 1. This processing procedure starts when the communication control part 132 receives instruction information instructing the start of tag reading from a wireless terminal of a user, for example.

First, the open/closed state determination part 131 determines the open/closed state of the door 2 in the load chamber of the vehicle 100 on the basis of the detection result of the open/closed sensor 3 (S101). Next, the radio wave control part 133 determines whether the state determined by the open/closed state determination part 131 is the open state (S102). If the door 2 is in the closed state (NO in S102), the radio wave control part 133 causes the communication element 4 to transmit radio waves at the first radio wave strength (S103). On the other hand, if the door 2 is in the open state (YES in S102), the radio wave control part 133 causes the communication element 4 to transmit radio waves at the second radio wave strength, which is lower than the first radio wave strength (S104). After processing of S103 or S104, the tag information acquisition part 134 acquires the tag information stored in the tag attached to the load, via the communication element 4 (S105), and ends the processing.

Effect of the Present Invention

According to the present embodiment, when the open/closed state determination part 131 determines that the door 2 is in the open state, the radio wave control part 133 controls the radio wave strength of the radio waves emitted by the communication element 4 to be the second radio wave strength, which is lower than the first radio wave strength, and therefore it is possible to prevent or reduce instances of the tag information acquisition part 134 acquiring the tag information of a tag attached to a load outside the load chamber. Therefore, the radio wave control part 133 can prevent the inability to distinguish between a load that has been carried into the load chamber and a load that has not been carried into the load chamber.

Second Embodiment

The case where the radio wave control part 133 controls the radio wave strength to be the second radio wave strength, which is lower than the first radio wave strength, when the open/closed state determination part 131 determines that the door is in the open state has been explained in the first embodiment. On the other hand, in a second embodiment, the reading controller 1 further includes the sensitivity control part 301, and an example in which the sensitivity control part 301 makes the reading sensitivity of the communication element 4 lower when the open/closed state determination part 131 determines that the door 2 is in the open state, as compared with the reading sensitivity in the closed state, will be described.

Figure 6:
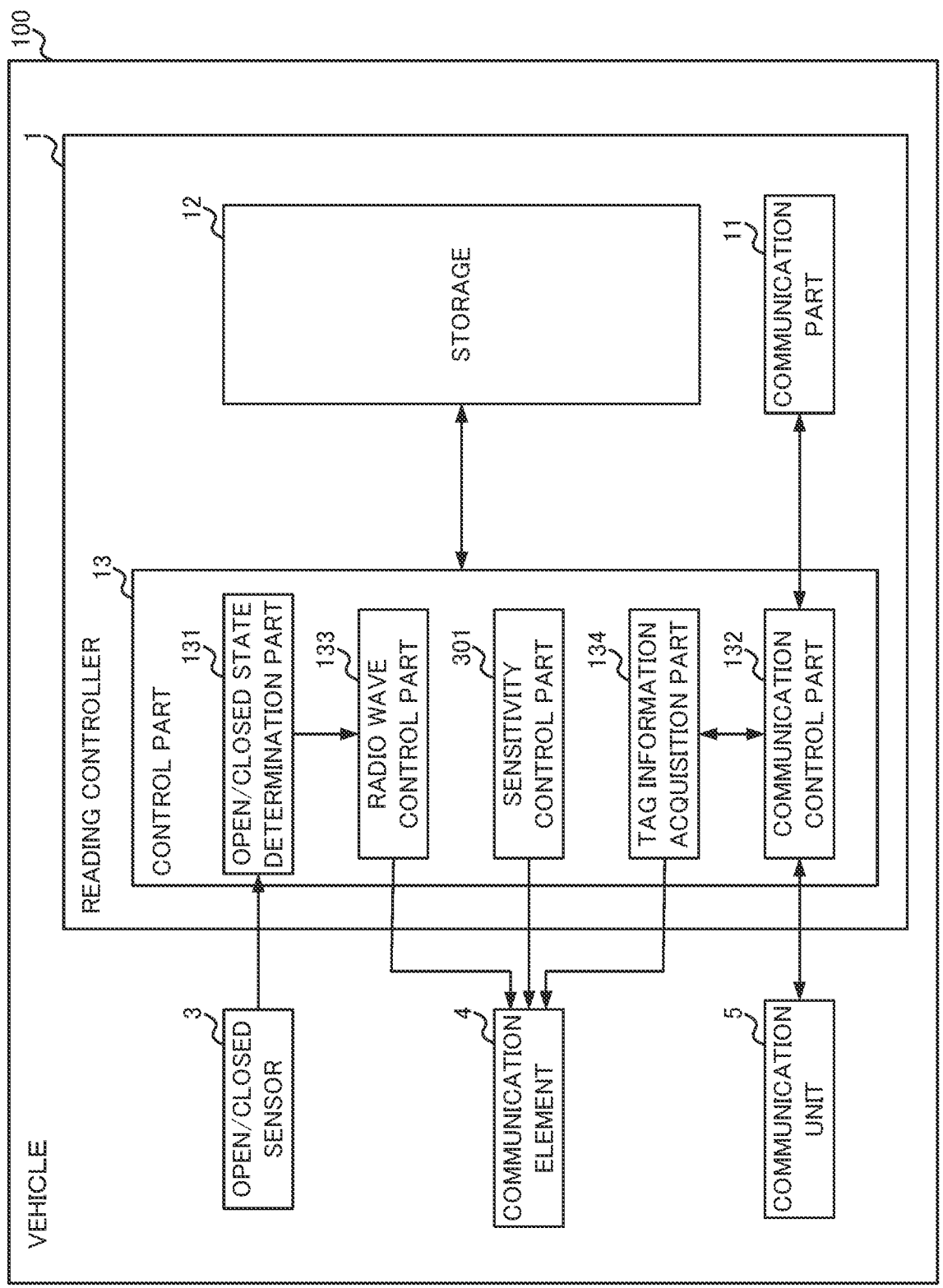
FIG. 6 shows a configuration of a vehicle equipped with a reading controller according to a second embodiment.

FIG. 6 shows a configuration of the vehicle 100 equipped with a reading controller 1 according to the second embodiment. Regarding the functional blocks other than the sensitivity control part 301 in FIG. 6, since they are the same as those in FIG. 2, the same reference numerals are used and the associated descriptions are omitted.

When the open/closed state determination part 131 determines that the door 2 is in the closed state, the sensitivity control part 301 controls the reading sensitivity of the communication element 4 to be a first reading sensitivity. The first reading sensitivity is a reading sensitivity realized by the communication element 4 demodulating radio waves having a received signal strength indication (RSSI) that exceeds a first RSSI and not demodulating radio waves of a signal strength less than or equal to the first RSSI, for example.

When the open/closed state determination part 131 determines that the door 2 is in the open state, the sensitivity control part 301 controls the reading sensitivity of the communication element 4 to be a second reading sensitivity, which is lower than the first reading sensitivity. The second reading sensitivity is realized by the communication element 4 demodulating radio waves having an RSSI that exceeds a second RSSI and not demodulating radio waves of a signal strength less than or equal to the second RSSI, for example. The second RSSI is a value greater than the first RSSI.

In this way, when the open/closed state determination part 131 determines that the door 2 is in the open state, the sensitivity control part 301 controls the reading sensitivity of the communication element 4 to be the second reading sensitivity, which is lower than the first reading sensitivity, and therefore it is possible to prevent the tag information acquisition part 134 from acquiring the tag information of a tag attached to a load outside the load chamber. On the other hand, when the open/closed state determination part 131 determines that the door 2 is in the closed state, the sensitivity control part 301 controls the reading sensitivity of the communication element 4 to be the first reading sensitivity, and therefore the success rate of the tag information acquisition part 134 acquiring the tag information of a tag attached to a load inside the load chamber can be increased.

When the open/closed state determination part 131 determines that the door 2 is in the open state, the radio wave control part 133 may make the radio wave strength of the radio waves emitted by the communication element 4 lower, as compared with the radio wave strength in the closed state, and the sensitivity control part 301 may make the reading sensitivity of the communication element 4 lower, as compared with the reading sensitivity in the closed state.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

DESCRIPTION OF THE REFERENCE NUMERALS

1 Reading controller
2 Door
3 Open/closed sensor
4 Communication element
5 Communication unit
11 Communication part
12 Storage
13 Control part
21 Communication part
22 Operation part
23 Display part
24 Storage
25 Control part
100 Vehicle
131 Open/closed state determination part
132 Communication control part
133 Radio wave control part
134 Tag information acquisition part
200 Wireless terminal
300 Management apparatus
301 Sensitivity control part

What is claimed is:

1. A reading controller comprising:
   an open/closed state determination part that determines an open state or a closed state of a door of a load chamber of a vehicle;
   a tag information acquisition part that acquires tag information stored in a tag attached to a load, via a communication element that is installed in the load chamber and reads the tag; and
   a radio wave control part that controls radio wave strength of radio waves emitted by the communication element for reading the tag to be a first radio wave strength when the open/closed state determination part determines that the door is in the closed state, and controls the radio wave strength to be a second radio wave strength, which is smaller than the first radio wave strength and larger than 0, when the open/closed state determination part determines that the door is in the open state.

2. The reading controller according to claim 1, wherein a plurality of the communication elements are disposed in the load chamber, and
   the radio wave control part makes the radio wave strength of the radio waves emitted by the communication element near the door among the plurality of communication elements installed in the load chamber lower than the radio wave strength emitted by the communication element distant from the door, when the open/closed state determination part determines that the door is in the open state.

3. A reading control method that is executed by a reading controller, the method comprising the steps of:
   determining an open state or a closed state of a door of a load chamber of a vehicle;
   acquiring tag information stored in a tag attached to a load, via a communication element that is installed in the load chamber and reads the tag; and
   controlling radio wave strength of radio waves emitted by the communication element for reading the tag to be a first radio wave strength when the door is determined to be in a closed state and controlling the radio wave strength to be a second radio wave strength, which is smaller than the first radio wave strength and larger than 0, when the door is determined to be in the open state.

4. The reading control method according to claim 3, wherein the method further comprises a step of transmitting the acquired tag information to a wireless terminal, executed by the reading controller, and steps of:
   receiving the tag information;
   determining, by referencing list information indicating a list of identification information of tags attached to a plurality of loads scheduled to be loaded in the load chamber, whether (i) the identification information of the tags included in the received tag information and (ii) the identification information of the tags included in list information match, and
   notifying a user of a determination result, that are executed by the wireless terminal.

5. The reading control method according to claim 4, wherein the wireless terminal notifies the user that the loads have not been loaded in a scheduled manner in the notifying step if it is determined that (i) the identification information of the tags included in the received tag information and (ii) the identification information of the tags included in the list information do not match after the tags are read at the first radio wave strength.

6. The reading control method according to claim 4, wherein the wireless terminal notifies the user of the identification information of the tag attached to a load that has not yet been carried into the load chamber among the identification information of the tags included in the list information in the notifying step.

* * * * *